(12) United States Patent
Roh (10) Patent No.: US 9,853,711 B2
(45) Date of Patent: Dec. 26, 2017

(54) METHOD AND APPARATUS FOR PROVIDING CONTENT AND METHOD AND APPARATUS FOR DISPLAYING CONTENT

(75) Inventor: Dong-Hyun Roh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1410 days.

(21) Appl. No.: 12/679,849

(22) PCT Filed: Sep. 23, 2008

(86) PCT No.: PCT/KR2008/005647
§ 371 (c)(1),
(2), (4) Date: Jun. 1, 2010

(87) PCT Pub. No.: WO2009/045014
PCT Pub. Date: Apr. 9, 2009

(65) Prior Publication Data
US 2010/0231507 A1 Sep. 16, 2010

(30) Foreign Application Priority Data
Oct. 4, 2007 (KR) .................. 10-2007-0099882

(51) Int. Cl.
*G09G 5/00* (2006.01)
*H04B 7/155* (2006.01)

(52) U.S. Cl.
CPC .............................. *H04B 7/15585* (2013.01)

(58) Field of Classification Search
CPC ............................................ H04B 7/15585
USPC ..................... 345/156; 455/456.1; 715/745
See application file for complete search history.

(56) References Cited

U.S. PATENT DOCUMENTS

| | | | |
|---|---|---|---|
| 7,188,137 B2 | 3/2007 | Inoue et al. | |
| 7,221,947 B2 * | 5/2007 | Casey | 455/456.1 |
| 7,395,055 B2 * | 7/2008 | Chitrapu et al. | 455/420 |
| 7,574,661 B2 * | 8/2009 | Matsuura et al. | 715/745 |
| 7,683,761 B2 * | 3/2010 | Burghard et al. | 340/10.2 |
| 7,996,019 B2 * | 8/2011 | Kale et al. | 455/456.3 |
| 8,086,183 B2 * | 12/2011 | Roh et al. | 455/66.1 |
| 8,351,897 B2 * | 1/2013 | Shin et al. | 455/405 |

(Continued)

FOREIGN PATENT DOCUMENTS

| | | |
|---|---|---|
| DE | 101 10 866 A1 | 10/2001 |
| JP | 2004-157993 | 6/2004 |

(Continued)

OTHER PUBLICATIONS

International Search Report dated Jan. 9, 2009, in corresponding International Application No. PCT/KR2008/005647 (3 pages).

(Continued)

*Primary Examiner* — Afroza Chowdhury
(74) *Attorney, Agent, or Firm* — NSIP Law (57) ABSTRACT

Provided are a method and apparatus for providing digital content and a method and apparatus for displaying digital content. In the displaying method, method of displaying content in a terminal, situational information including at least one of information regarding a user of the terminal and information regarding an external environment is collected, whether the collected situational information conforms to display conditions of the content is determined, and then, the content is selectively displayed based on a result of the determining.

15 Claims, 5 Drawing Sheets (56) References Cited

U.S. PATENT DOCUMENTS

| | | |
|---|---|---|
| 2005/0080665 A1 | 4/2005 | Bowman-Amuah |
| 2006/0123335 A1* | 6/2006 | Sanchez et al. ............ 715/517 |
| 2006/0293065 A1* | 12/2006 | Chew et al. ............ 455/456.3 |
| 2007/0011051 A1 | 1/2007 | Findlay et al. |
| 2007/0271519 A1* | 11/2007 | Hu et al. ...................... 715/745 |
| 2007/0273558 A1* | 11/2007 | Smith et al. ............... 340/995.1 |
| 2008/0154696 A1* | 6/2008 | Spiegelman et al. ........... 705/10 |
| 2009/0187463 A1* | 7/2009 | DaCosta ........................ 705/10 |
| 2009/0319504 A1* | 12/2009 | Alberth et al. .................... 707/5 |
| 2010/0118025 A1* | 5/2010 | Smith et al. .................. 345/418 |
| 2010/0131335 A1* | 5/2010 | Roh et al. ...................... 705/10 |
| 2011/0034129 A1* | 2/2011 | Kim et al. ................... 455/41.3 |

FOREIGN PATENT DOCUMENTS

| | | |
|---|---|---|
| JP | 2005-275828 | 10/2005 |
| JP | 2007-108134 | 4/2007 |
| KR | 10-2003-0022838 | 3/2003 |
| KR | 10-2005-0064345 | 6/2005 |
| KR | 10-0650512 B1 | 11/2006 |
| KR | 10-2006-0127647 | 12/2006 |
| KR | 10-20007-0009267 A1 | 1/2007 |
| KR | 10-2007-0056673 | 6/2007 |
| WO | WO 2004/084030 | 9/2004 |

OTHER PUBLICATIONS

International Search Report for corresponding International Application No. PCT/KR2007/005647.

Written Opinion for corresponding International Application No. PCT/KR2007/005647.

Extended European Search Report dated Sep. 26, 2013 in counterpart European Application No. 13181847.8 (6 pages, in English).

European Communication pursuant to Article 94(3) EPC, dated Aug. 3, 2012, issued in counterpart European Patent Application No. 08 835 654.8; 6 pages.

\* cited by examiner

METHOD AND APPARATUS FOR PROVIDING CONTENT AND METHOD AND APPARATUS FOR DISPLAYING CONTENT

CROSS-REFERENCE TO RELATED APPLICATIONS

This application claims priority to International Application No. PCT/KR2007/005647, filed on Sep. 23, 2009, which claims priority to Korean Patent Application No. 10-2009-0032923, filed on Oct. 4, 2007, the disclosure of each which is hereby incorporated by reference in its entirety for all purposes.

BACKGROUND

1. Field

The following description relates to a method and apparatus for providing content and a method and apparatus for displaying content, and more particularly, to a method and apparatus for providing digital content and a method and apparatus for displaying digital content.

2. Description of the Related Art

With the development of communication means, such as the Internet, the type and number of content provided to users have exponentially increased. The issue of when and where content is displayed is important. For example, in the case of content advertising blue jeans, if a user needs blue jeans, the content is useful to the user. However, if the user is not interested in blue jeans, the content is not useful to the user and thus inconvenience is caused to the user when the content is displayed.

Also, a user may have different impressions of even the same content according to an ambient environment. For example, the user may feel different impressions of the same music content depending on whether the user plays the content at home or on the street. Also, the user may feel different impressions of the same music content depending on whether the user plays the content on a sunny day or a rainy day.

As described above, content that is determined to be useful to a user when it is displayed in an optimum environment may be determined to be useless to the user when it is displayed in another environment. A user may feel that content, which can positively affect the user when it is displayed in an optimum environment, sounds noisy when it is displayed in another environment.

SUMMARY

Accordingly, in one general aspect, there is provided a method and apparatus for providing content so that the content can be effectively displayed, and a method and apparatus for displaying the content.

According to an aspect, there is provided a method of displaying content in a terminal, the method comprising collecting situational information containing at least one of information regarding a user of the terminal and information regarding an external environment; determining whether the collected situational information conforms to display conditions of the content; and selectively displaying the content based on a result of the determining.

The selective displaying of the content may include if the result of the determining reveals that the collected situational information conforms to the display conditions, displaying a message inquiring whether to display the content; and displaying the content based on a positive reply to the message.

The selective displaying of the content may include storing the content if the result of the determining reveals that the collected situational information does not conform to the display conditions; and continuously monitoring whether situational information that is being collected conforms to the display conditions.

The method may further include receiving information regarding the display conditions.

The receiving of the information regarding the display conditions may include receiving metadata regarding the content, which includes the information regarding the display conditions, together with the content.

The receiving of the information regarding the display conditions may include receiving the display conditions and address information regarding a space storing the content.

The selective displaying of the content may include if the result of determining reveals that the collected situational information conforms to the display conditions, receiving the content based on the address information; and displaying the received content.

The information regarding the user may specify at least one of a user's preference, current location, action, feelings, physical condition, and schedule, and the information regarding the external environment comprises at least one of a current time, atmospheric conditions, neighborhood, and the neighborhood's state.

According to another aspect, there is provided a method of providing content to a user terminal, the method including generating display conditions of the content in such a manner that the content is displayed when situational information conforms to predetermined conditions, where the situational information contains at least one of information regarding a user of the user terminal and information regarding an external environment; and transmitting the display conditions and the content to the user terminal.

The transmitting of the display conditions and the content may include transmitting address information regarding a space storing the content and the display conditions to the user terminal; receiving a request to transmit the content from the user terminal; and transmitting the content to the user terminal in response to the request.

The transmitting of the display conditions and the content may include adding the display conditions to metadata of the content; and transmitting the metadata of the content, which includes the display conditions, and the content to the user terminal.

According to another aspect, there is provided an apparatus for displaying content, the apparatus comprising a situational information collection unit collecting situational information which contains at least one of information regarding a user of the apparatus and information regarding an external environment; a determination unit determining whether the collected situational information conforms to display conditions of the content; and a display unit selectively displaying the content based on a result of the determining.

According to another aspect, there is provided a apparatus for providing content to a user terminal, the apparatus comprising a display conditions generation unit generating display conditions of the content in such a manner that the content is to be displayed when situational information conforms to predetermined conditions, where the situational information contains at least one of information regarding a user of the user terminal and information regarding an external environment; and a transmission unit transmitting the display conditions and the content to the user terminal.

Accordingly, it is possible to effectively display content in an optimum environment by defining display conditions of the content based on situational information that can be collected.

Other features and aspects will become apparent to those skilled in the art from the following detailed description, the attached drawings, and the claims.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Descriptions of well-known functions and structures may be omitted for enhanced clarity and conciseness.

Figure 1:
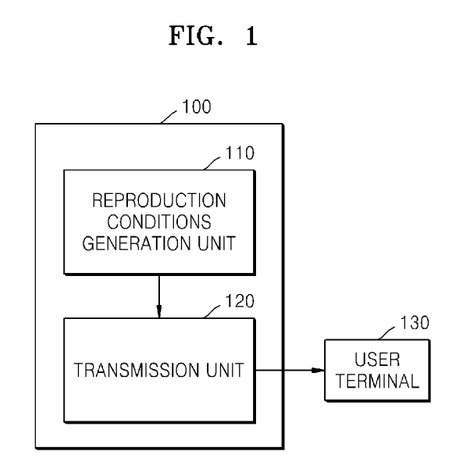
FIG. 1 is a block diagram of a content providing apparatus according to an embodiment.

FIG. 1 is a block diagram of a content providing apparatus 100 according to an embodiment. The content providing apparatus 100 includes a display conditions generation unit 110 and a transmission unit 120.

The display conditions generation unit 110 may generate display conditions of content in such a manner that the content can be displayed when situational information that includes at least one of information regarding a user of a user terminal 130 and information regarding an external environment conforms to predetermined conditions. The display conditions of the content indicates conditions under which the content is to be displayed in the user terminal 130.

The information regarding the user may specify any information regarding the user, for example, the user's preference, matter of concern, physical condition, feelings, action, current location, schedule, and/or the number of times that the user visited a specific location.

The information regarding the external environment may specify any information regarding the environment surrounding the user, such as weather (e.g., temperature and humidity), information on a state of people adjacent to the user, and/or information regarding a state of people who belong to the same group to which the user belongs.

Situational information may contain at least one of information regarding a user and information regarding an external environment.

The display conditions may be individually generated for each item of content or may be obtained by selecting at least one of a plurality of pieces of situational information stored in the content providing apparatus 100.

For example, the display conditions may be set so that the content can be displayed when all situational information specifying "rain, evening, and on the user's way back from the office" is satisfied. Alternatively, the display conditions may be set so that the content can be displayed when all situational information specifying "during a date, supper, and spaghetti is preferred" is satisfied. In this example, if a user who prefers to eat spaghetti has supper during a date, the content is displayed in the user terminal 130.

The display conditions may be generated based on situational information of a point of time in the past or the future. For example, the display conditions may be set so that the content can be displayed in the user terminal 130 at 9 o'clock when a schedule and weather for a next day satisfy conditions such as "supposed to go to Seoul tomorrow, a probability that it will rain tomorrow is 80% or more, and 9 o'clock pm."

The transmission unit 120 may transmit the display conditions and the content to the user terminal 130.

The transmission unit 120 can insert the display conditions into metadata of the content and then transmit the metadata together with the content to the user terminal 130. A method of inserting display conditions into metadata of content and transmitting the metadata together with the content to a user terminal according to an embodiment, will be described later with reference to FIG. 3. However, in this case, display of the content may be delayed while the content is stored in a storage space of the user terminal 130 until situational information corrected by the user terminal 130 conforms to the display conditions, which may waste resources.

To solve this problem, the transmission unit 120 may transmit the display conditions to the user terminal 130, separately from the content. In this case, the display conditions may be generated in the form of a file specifying either the address or a uniform resource locator (URL).

In this case, the transmission unit 120 may first transmit only the display conditions to the user terminal 130. Then, if the user terminal 130 requests the content providing apparatus 100 to send the content since the situational information collected by the user terminal 130 conforms to the display conditions, the transmission unit 120 may transmit the content to the user terminal 130. A method of transmitting display conditions of content in the form of a file manufactured separately from the content according to an embodiment will be described later with reference to FIG. 4.

Figure 2:
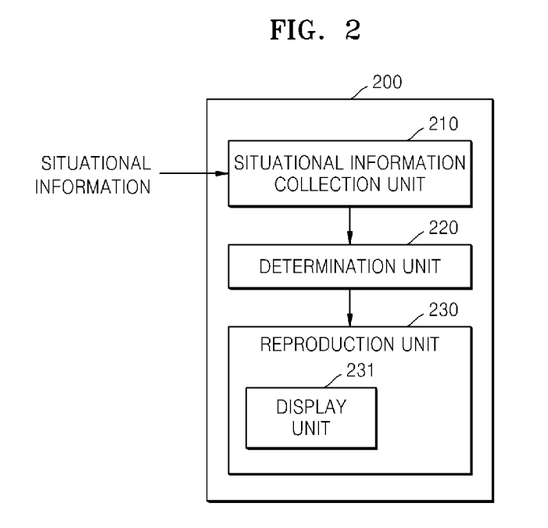
FIG. 2 is a block diagram of a content displaying apparatus according to an embodiment.

FIG. 2 is a block diagram of a content displaying apparatus 200 according to an embodiment. The content displaying apparatus 200 may include a situational information collection unit 210, a determination unit 220, and a display unit 230.

The situational information collection unit 210 collects situational information that may include at least one of information regarding a user and information regarding an external environment. The situational information may be collected from a user's input, by executing an application in the content displaying apparatus 200, or collected via a sensor (not shown), for example, mounted on the content displaying apparatus 200. Also, the situational information may be collected from a server connected to the content displaying apparatus 200, e.g., via an external communication network.

For example, the situational information collection unit 210 may collect either a schedule input by the user or weather information that is obtained by accessing the Meteorological Administration's server via an external communication network, as the situational information. Otherwise, the situational information collection unit 210 may collect either the location of the user, which may be determined by using a global positioning system (GPS), or the user's preference regarding content or food, which may be determined based on the details of use of an application, as the situational information. Also, the situational information collection unit 210 may collect the speed and/or direction of movement of the user, e.g., by using a direction sensor and/or an acceleration sensor mounted on the content displaying apparatus 200, or state information of other users transmitted from their terminals, as the situational information.

The above methods of collecting the situational information by using the situational information collection unit 210 are example embodiments. That is, the situational information may be collected in various ways, e.g., from a user's input, via a sensor, by accessing another server or terminal via an external communication network, or by analyzing the details of execution of an application.

The determination unit 220 may determine whether the collected situational information conforms to the display conditions.

The display unit 230 may selectively display the content based on the result of determination received from the determination unit 220. That is, if the determination unit 220 determines that the collected situational information conforms to the display conditions, the display unit 230 may display the content.

The display unit 230 may include a display unit 231 for content display. The display unit 231 can immediately display the content if the collected situational information conforms to the display conditions. Also, the display unit 231 can display a message inquiring whether to display the content in order to induce the user to instruct that the content be displayed. The display unit 231 may display the content based on a reply to the message. For example, in order to induce the user's input, a message stating "○○ content satisfies a display conditions. Do you want to display the ○○ content now?" is displayed on the display unit 231, e.g., a touch pad type display unit. Then if the user clicks a "Yes" button (not shown) of the content displaying apparatus 200, or an equivalent prompt or button, the content may be displayed.

If the determination unit 220 determines that the collected situational information does not conform to the display conditions, the display unit 230 may not display the content and may then store the content until situational information conforms to the display conditions. In this case, the content may be stored in a storage unit (not shown). The display unit 230 may further include a monitor unit (not shown) in order to monitor whether situational information that is to be collected conforms to the display conditions. The monitor unit may continuously monitor whether situational information collected the by situational information collection unit 210 conforms to the display conditions, at regular intervals of time. If situational information conforms to the display conditions, the display unit 230 may be controlled to display the content.

Figure 3:
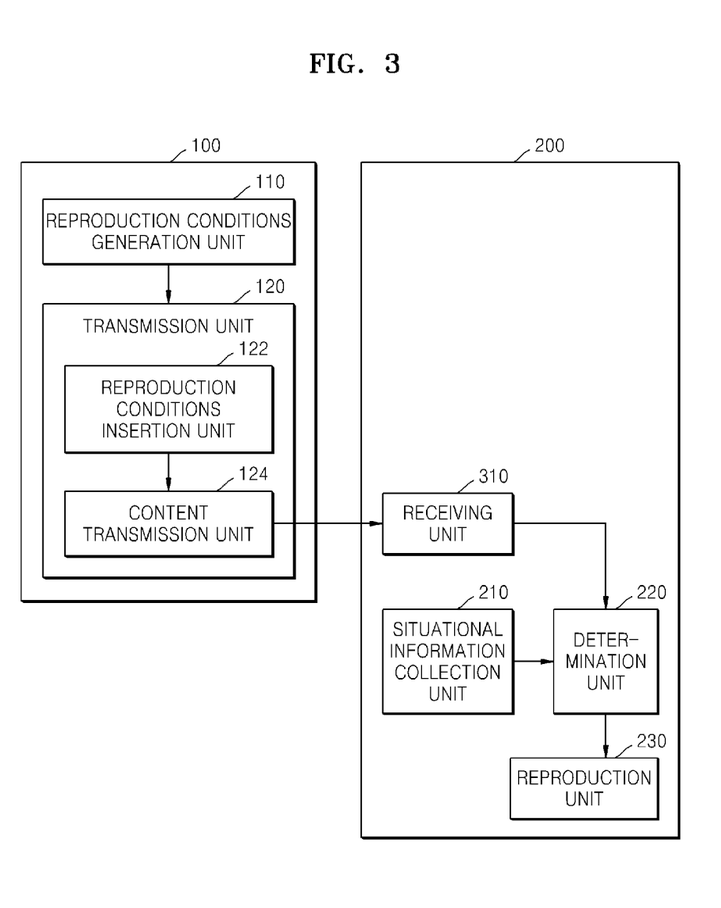
FIG. 3 is a block diagram of a content providing apparatus and a content displaying apparatus according to an embodiment.

FIG. 3 is a block diagram of a content providing apparatus 100 and a content displaying apparatus 200 according to an embodiment.

The content providing apparatus 100 may include a display conditions generation unit 110 and a transmission unit 120. The reference numerals that are the same as those of FIG. 1 denote the same elements, and duplicative description of their operations or characteristics will be omitted.

In the present embodiment, it is presumed that content is an image file, e.g., entitled "coupon.jpg", which may be a coupon available at predetermined restaurants in Myondong between 18:00 and 20:00 from the $1^{st}$ to the $10^{th}$ of October. Also, it is presumed that display conditions are generated in such a manner that the "coupon.jpg" file can be displayed when a current date is between the $1^{st}$ and the $10^{th}$ of October, a current location is Myong-dong, and a current time is between 18:00 and 20:00.

The transmission unit 120 may include a display conditions insertion unit 122 and a content transmission unit 124.

The display conditions insertion unit 122 may insert the display conditions into metadata regarding the content. In this case, the display conditions may be present in a content file in the form of metadata.

The content transmission unit 124 may transmit the metadata of the content, which may include the display conditions, and the content to the content displaying apparatus 200. In general, metadata may be present in a content file and the display conditions can be delivered by simply transmitting only the content.

The content displaying apparatus 200 may include a receiving unit 310, a situational information collection unit 210, a determination unit 220, and a display unit 230.

The reference numerals that are the same as those of FIG. 2 denote the same elements, and duplicative description of their operations or characteristics will be omitted.

The receiving unit 310 may receive information regarding the display conditions of the content. In the present embodiment, since the display conditions are included in the content in the form of metadata, the receiving unit 310 can obtain the display conditions by receiving the content and analyzing the metadata of the content.

If the determination unit 220 determines that the display conditions of the content received by the receiving unit 310 conforms to situational information collected by the situational information collection unit 210, the display unit 230 May display the content. For example, if a user arrives in Myong-dong at 19:00 on the $5^{th}$ of October, situational information collected by a GPS and a clock mounted on the content displaying apparatus 200 conforms to the display conditions. Thus, the display unit 230 may display the "coupon.jpg" file. A user can properly obtain the coupon by displaying the content at a desired time.

Figure 4:
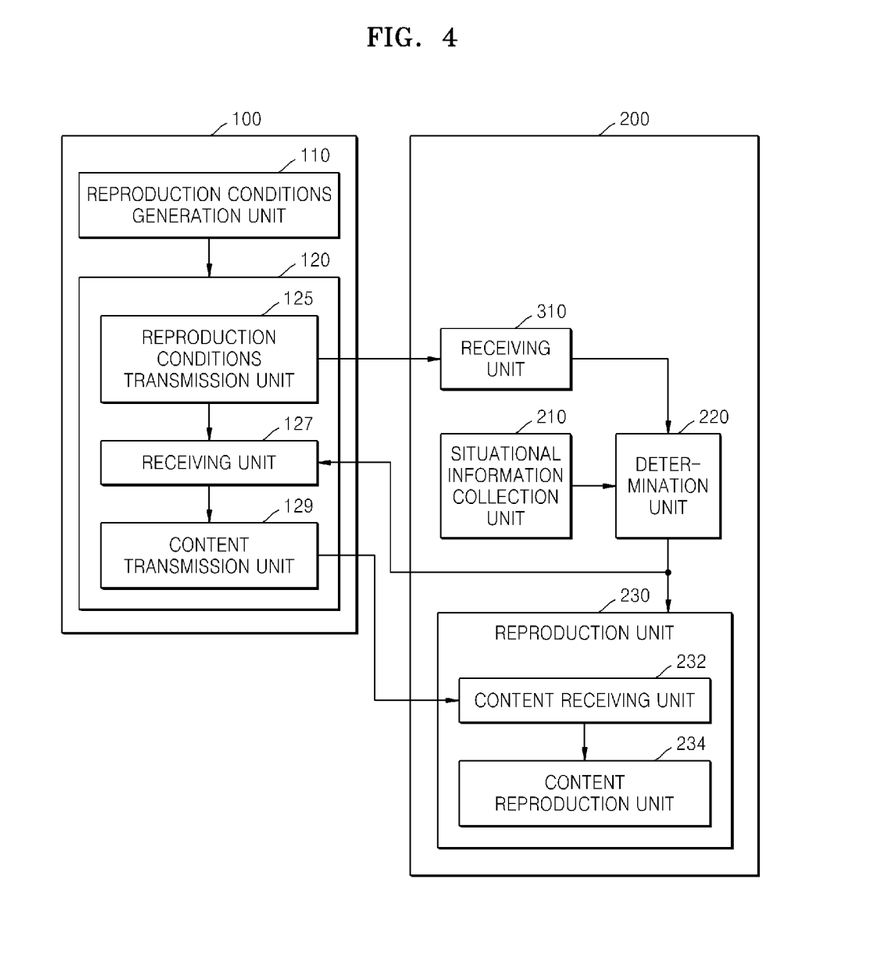
FIG. 4 is a block diagram of a content providing apparatus and a content displaying apparatus according to another embodiment.

FIG. 4 is a block diagram of a content providing apparatus 100 and a content displaying apparatus 200 according to another embodiment.

Here, the reference numerals that are the same as those of FIGS. 1 and 2 denote the same elements, and duplicative description of their operations or characteristics will be omitted.

In the present embodiment, it is presumed that content is a music file entitled "Like rain like music.mp3", and that display conditions of the content are generated in such a manner that the "Like rain like music.mp3" file is to be displayed when situational information (e.g., time: 18:00 to 20:00, location: inside a room, and weather: rainy or cloudy) is satisfied. Also, it is presumed that the display conditions are manufactured in the form of a file, separately from the content and the file contains address information regarding a space storing the "Like rain like music.mp3" file.

A transmission unit 120 included in the content providing apparatus 100 may include a display conditions transmission unit 125, a receiving unit 127, and a content transmission unit 129.

The display conditions transmission unit 125 may transmit the generated display conditions to the content displaying apparatus 200. That is, the display conditions transmission unit 125 may transmit the display conditions specifying time: 18:00 to 20:00, location: inside a room, and weather: rain or cloudy, to the content displaying apparatus 200.

A receiving unit 310 included in the content displaying apparatus 200 may receive a file recording the display conditions from the display conditions transmission unit 125. As described above, the received file may contain both the display conditions and the address information regarding the space storing the content.

If a user is watching a television inside a room at 21:00 on a rainy day, situational information including location information of a user which is collected via a GPS, time information collected by using a clock mounted on the content displaying apparatus 200, and weather information collected from the Meteorological Administration via an external communication network, may conform to the display conditions.

If a determination unit 220 determines that the display conditions received from the receiving unit 310 conforms to situational information collected by the situational information collection unit 210, the determination unit 220 may control the display unit 230 to display the content.

The display unit 230 may include a content receiving unit 232 and a content display unit 234.

If the determination unit 220 determines that the display conditions received from the receiving unit 310 conform to the situational information collected by the situational information collection unit 210, the determination unit 220 may request the content by using the address information of the content stored and then the content receiving unit 232 receives the content transmitted in response to the request. If the content is stored in an external server, the determination unit 220 may request the external server to send the content by using the address information of the content stored. However, in the present embodiment, it is presumed that the content is stored in the content providing apparatus 100. Thus the determination unit 220 may request the content providing apparatus 100 to provide the content.

A receiving unit 127 included in a content providing apparatus 100 may receive the request for the content from the determination unit 220 included in the content displaying apparatus 200.

The content transmission unit 129 included in the content providing apparatus 100 may transmit the content to the content displaying apparatus 200 in response to the request. That is, the content transmission unit 129 may transmit the "like rain like music.mp3" file to the content displaying apparatus 200.

The content display unit 234 may display the content received from the content transmission unit 129. The content display unit 234 can display the content after finishing downloading of the content, or can display the content in a streaming format.

Since sensations that a user can experience can vary, even with the same content, according to an environment in which the content is displayed, the content may be displayed in an optimum environment. Display conditions of content may be set based on situational information determined as an optimum environment by a user who has already displayed the content and then may be provided to other users so that they can display the content in the optimum environment.

Embodiments include a situational recognition alarm service that informs a user whether a current state conforms to a predetermined situation, a situational recognition post-it service that provides a user with predetermined information when the current state conforms to the predetermined situation, a situational recognition advertisement that maximizes the effect of an advertisement by displaying advertisement content when the current state conforms to the predetermined situation, and a situational recognition messaging service that allows a predetermined message to be delivered when the current state conforms to the predetermined situation.

Figure 5:
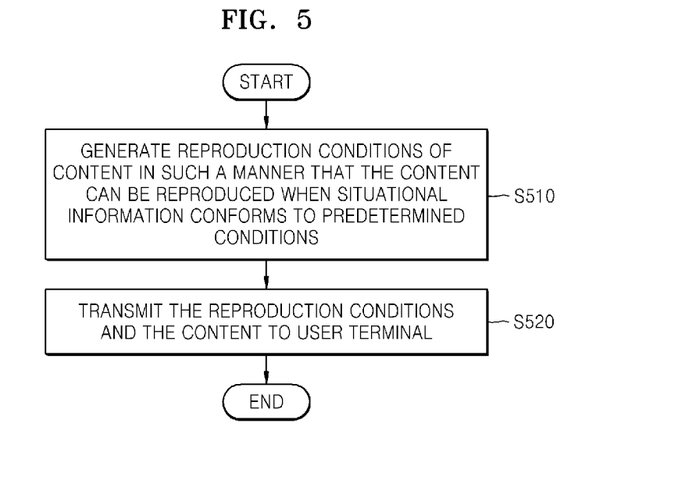
FIG. 5 is a flowchart illustrating a method of providing content to a user terminal according to an embodiment.

FIG. 5 is a flowchart illustrating a method of providing content to a user terminal according to an embodiment.

In operation S510, display conditions of content may be generated in such a manner that the content can be displayed when situational information containing at least one of information regarding a user and information regarding an external environment conforms to the display conditions.

In operation S520, the display conditions and the content may be delivered to a user terminal.

The display conditions and the content may be delivered to the user terminal by either inserting the display conditions into the content and delivering the content, or by separately delivering the display conditions and the content.

In order to insert the display conditions into the content and deliver the content to the user terminal, the display conditions may be inserted into metadata of the content. In this case, the metadata of the content into which the display conditions may be inserted, and the content may be delivered to the user terminal.

In order to separately deliver the display conditions and the content, the display conditions and a file storing address information of a space that stores the content, may be first transmitted to the user terminal. Then if a request to provide the content is received from the user terminal, the content may be transmitted to the user terminal in response to the request.

Figure 6:
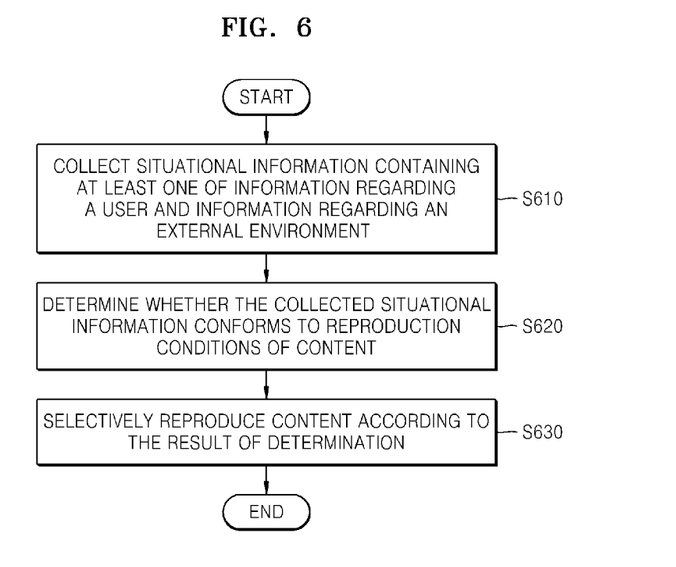
FIG. 6 is a flowchart illustrating a method of displaying content in a user terminal according to another embodiment.

FIG. 6 is a flowchart illustrating a method of displaying content in a user terminal according to an embodiment.

In operation S610, situational information containing at least one of information regarding a user and information regarding an external environment, may be collected.

In operation S620, it is determined whether the collected situational information conforms to display conditions of content.

In operation S630, the content may be selectively displayed according to the determination made in operation S620.

If it is determined in operation S620 that the collected situational information conforms to the display conditions, the content can be displayed without any instructions from the user or can be stored in a storage space that stores content whose display conditions are satisfied. Also, in order to induce the user to give an instruction that the content be displayed, a message inquiring whether to display the content may be displayed on the user terminal and the content may be displayed in response to a reply to the message.

If it is determined in operation S620 that the collected situational information does not conform to the display conditions, the content may be stored without being displayed. At the same time, it may be possible to continue to monitor whether situational information that is being collected conforms to the display conditions, so that the content can be displayed at the instant of the time that the situational information conforms to the display conditions.

The method of FIG. 6 may further include receiving information regarding the display conditions prior to performing operation S610. The display conditions may be included in the content in the form of metadata regarding the content and then received together with the content. Also, a file storing the display conditions and address information regarding the content may be received separately from the content.

In this example, if the collected situational information conforms to the display conditions, the content can be received based on the address information and then be displayed.

Figure 7:
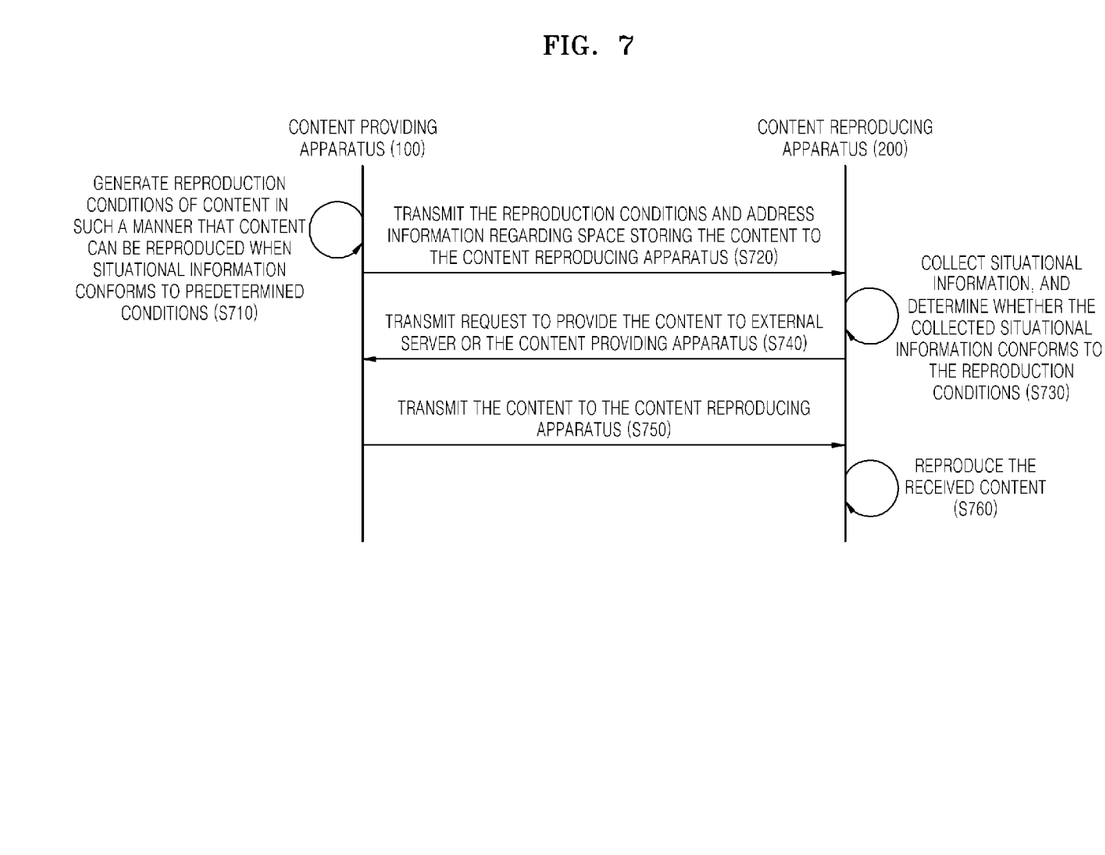
FIG. 7 is a flowchart illustrating a method of providing and displaying content by using a user terminal according to an embodiment.

FIG. 7 is a flowchart illustrating a method of providing and displaying content according to an embodiment.

In operation S710, a content providing apparatus 100 may generate display conditions of content in such a manner that the content can be displayed when situational information containing at least one of information regarding the state of a user of a content displaying apparatus 200 and information regarding an external environment conforms to predetermined conditions.

In operation S720, the content providing apparatus 100 may transmit the display conditions and address information regarding a space storing the content to the content displaying apparatus 200.

In operation S730, the content displaying apparatus 200 may collect such situational information, and may determine whether the collected situational information conforms to the display conditions.

In operation S740, the content displaying apparatus 200 may transmit a request to provide the content, to an external server or the content providing apparatus 100.

In operation S750, the external server or the content providing apparatus 100 may transmit the content to the content displaying apparatus 200 in response to the request.

In operation S760, the content displaying apparatus 200 may display the received content.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method executed by a terminal for displaying content, the method comprising:
   receiving, by the terminal and from a content providing apparatus, information regarding conditions for displaying the content;
   collecting, by the terminal, situational information comprising at least one of information regarding a user of the terminal and information regarding an external environment;
   determining, by the terminal, whether the collected situational information matches the conditions for displaying the content; and
   selectively displaying, by the terminal, the content based on a result of the determining, wherein
   the receiving of the information regarding the display conditions comprises receiving metadata regarding the content together with the content, the metadata comprising the information regarding the display conditions.

2. The method of claim 1, wherein the selective displaying of the content comprises:
   if the collected situational information matches the display conditions, displaying a message inquiring whether to display the content; and
   displaying the content based on a positive reply to the message.

3. The method of claim 1, wherein the selective displaying of the content comprises:
   storing the content if the collected situational information does not match the display conditions; and
   continuously monitoring whether situational information that is being collected matches the display conditions.

4. The method of claim 1, wherein:
   the information regarding the user specifies at least one of a user's: preference, current location, action, feelings, physical condition, and schedule; and
   the information regarding the external environment comprises at least one of: a current time, atmospheric conditions, a neighborhood, and the neighborhood's state.

5. A non-transitory computer-readable medium having recorded thereon a program for executing the method of claim 1.

6. A method executed by a terminal for displaying content, the method comprising:
   receiving, by the terminal and from a content providing apparatus, information regarding conditions for displaying the content;
   collecting, by the terminal, situational information comprising at least one of information regarding a user of the terminal and information regarding an external environment;

determining, by the terminal, whether the collected situational information matches the conditions for displaying the content; and selectively displaying, by the terminal, the content based on a result of the determining, wherein:

the receiving of the information regarding the display conditions comprises receiving the display conditions and address information regarding a space storing the content; and the selective displaying of the content comprises:

if the result of determining reveals that the collected situational information matches the display conditions, receiving the content based on the address information, and displaying the received content.

7. A method of providing content to a user terminal, the method comprising:

generating, by a content providing apparatus, conditions for displaying the content such that the content is displayed in response to situational information matching the generated conditions, the situational information comprising at least one of information regarding a user of the user terminal and information regarding an external environment; and transmitting, by a content providing apparatus, the generated conditions for displaying the content and the content to the user terminal, wherein:

the transmitting of the display conditions and the content comprises:

transmitting address information regarding a space storing the content and the display conditions to the user terminal;

receiving a request to transmit the content from the user terminal; and transmitting the content to the user terminal in response to the request.

8. A non-transitory computer-readable medium having recorded thereon a program for executing the method of claim 7.

9. A method of providing content to a user terminal, the method comprising:

generating, by a content providing apparatus, conditions for displaying the content such that the content is displayed in response to situational information matching the generated conditions, the situational information comprising at least one of information regarding a user of the user terminal and information regarding an external environment; and transmitting, by a content providing apparatus, the generated conditions for displaying the content and the content to the user terminal, wherein:

the transmitting of the display conditions and the content comprises:

adding the display conditions to metadata of the content; and transmitting the metadata of the content and the content to the user terminal, the metadata comprising the display conditions.

10. An apparatus for displaying content, the apparatus comprising:

a receiving unit configured to receive information regarding conditions for displaying the content;

a situational information collection unit configured to collect situational information comprising at least one of information regarding a user of the apparatus and information regarding an external environment;

a determination unit configured to determine whether the collected situational information matches conditions for displaying the content; and a display unit configured to selectively display the content based on a result of the determining, wherein the receiving unit is further configured to receive metadata of the content together with the content, the metadata comprising the information regarding the display conditions.

11. The apparatus of claim 10, wherein:

the information regarding the user specifies at least one of a users: preference, current location, action, feelings, physical condition, and schedule; and the information regarding the external environment comprises at least one of: a current time, atmospheric conditions, a neighborhood, and the neighborhood's state.

12. An apparatus for displaying content, the apparatus comprising:

a receiving unit configured to receive information regarding conditions for displaying the content;

a situational information collection unit configured to collect situational information comprising at least one of information regarding a user of the apparatus and information regarding an external environment;

a determination unit configured to determine whether the collected situational information matches conditions for displaying the content; and a display unit configured to selectively display the content based on a result of the determining, wherein:

the receiving unit is further configured to receive the display conditions and address information regarding a space storing the content, and the display unit comprises:

a content receiving unit configured to receive the content based on the address information if the collected situational information matches the display condition; and a content display unit configured to display the received content.

13. The apparatus of claim 10, wherein the display unit comprises:

a storage unit configured to store the content if the collected situational information does not match the display condition; and a monitor unit configured to continuously monitor whether situational information, which is being collected, matches the display conditions.

14. An apparatus for providing content to a user terminal, the apparatus comprising:

a display conditions generation unit configured to generate conditions for displaying the content such that the content is to be displayed when situational information matches the generated conditions, the situational information comprising at least one of information regarding a user of the user terminal and information regarding an external environment; and a transmission unit configured to transmit the generated conditions for displaying the content and the content to the user terminal, wherein:

the transmission unit comprises:

a display conditions transmission unit configured to transmit address information regarding a space storing the content, and the display conditions to the user terminal;

a receiving unit configured to receive a request to transmit the content from the user terminal; and a content transmission unit configured to transmit the content to the user terminal in response to the request.

15. An apparatus for providing content to a user terminal, the apparatus comprising:

a display conditions generation unit configured to generate conditions for displaying the content such that the content is to be displayed when situational information matches the generated conditions, the situational information comprising at least one or information regarding a user of the user terminal and information regarding an external environment; and a transmission unit configured to transmit the generated conditions for displaying the content and the content to the user terminal, wherein:

the transmission unit comprises:

a display conditions insertion unit configured to insert the display conditions into metadata of the content; and a content transmission unit configured to transmit the metadata of the content and the content to the user terminal, the metadata comprising the display conditions.

* * * * *